(12) United States Patent
Schafer et al.

(10) Patent No.: US 9,638,306 B2
(45) Date of Patent: May 2, 2017

(54) CAMSHAFT UNIT

(71) Applicant: Schaeffler Technologies GmbH & Co. KG, Herzogenaurach (DE)

(72) Inventors: Jens Schafer, Herzogenaurach (DE); Sebastian Zwahr, Obermichelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/401,693

(22) PCT Filed: May 16, 2013

(86) PCT No.: PCT/EP2013/060189
§ 371 (c)(1),
(2) Date: Nov. 17, 2014

(87) PCT Pub. No.: WO2013/171322
PCT Pub. Date: Nov. 21, 2013

(65) Prior Publication Data
US 2015/0135864 A1    May 21, 2015

(30) Foreign Application Priority Data
May 18, 2012  (DE) .......... 10 2012 010 133

(51) Int. Cl.
| F16H 53/00 | (2006.01) |
| F16H 53/04 | (2006.01) |
| F01L 1/344 | (2006.01) |
| F16H 35/00 | (2006.01) |

(52) U.S. Cl.
CPC ............ *F16H 53/04* (2013.01); *F01L 1/3442* (2013.01); *F01L 1/34403* (2013.01); *F01L 1/34413* (2013.01); *F16H 35/008* (2013.01); *Y10T 74/1836* (2015.01)

(58) Field of Classification Search
CPC ..... F16H 53/04; F16H 35/008; F01L 1/34403
See application file for complete search history.

(56) References Cited

U.S. PATENT DOCUMENTS

| 3,807,243 A | * | 4/1974 | Yada .................. F16H 25/04 464/160 |
| 5,803,030 A | * | 9/1998 | Cole .................... F01L 1/344 123/90.17 |
| 6,199,522 B1 | * | 3/2001 | Regueiro .............. F01L 1/344 123/90.15 |
| 6,216,654 B1 | | 4/2001 | Regueiro |
| 6,725,817 B2 | | 4/2004 | Methley et al. |
| 9,297,283 B2 | * | 3/2016 | Schafer .............. F01L 1/34406 |

(Continued)

FOREIGN PATENT DOCUMENTS

| DE | 4230074 | 3/1994 |
| DE | 4402907 | 8/1995 |

(Continued)

*Primary Examiner* — Vicky Johnson
(74) *Attorney, Agent, or Firm* — Volpe and Koenig, P.C.

(57) ABSTRACT

A camshaft unit (1), having a first camshaft (2) which is phase-adjustable with respect to a crankshaft, having a second camshaft (3) which is arranged concentrically with respect to the first camshaft (2), and having a camshaft adjuster (5) by which both camshafts (2, 3) are phase-adjusted with respect to the crankshaft.

12 Claims, 2 Drawing Sheets

(56) References Cited

U.S. PATENT DOCUMENTS

| | | | |
|---|---|---|---|
| 2002/0038639 A1 | 4/2002 | Mae et al. | |
| 2005/0226736 A1 | 10/2005 | Lancefield et al. | |
| 2009/0183702 A1 | 7/2009 | Knecht et al. | |
| 2009/0314235 A1 | 12/2009 | Rozario et al. | |
| 2012/0227689 A1* | 9/2012 | Bechtold | F01L 1/047 123/90.6 |
| 2012/0285405 A1* | 11/2012 | Pierik | F01L 1/34 123/90.15 |
| 2015/0122208 A1* | 5/2015 | Schafer | F01L 1/34406 123/90.17 |

FOREIGN PATENT DOCUMENTS

| | | | | |
|---|---|---|---|---|
| DE | 102008033230 | | 7/2009 | |
| DE | WO 2011134729 | * | 11/2011 | F01L 1/047 |
| EP | 0582846 | | 7/1993 | |
| EP | 1803904 | | 7/2007 | |
| GB | 2327737 | | 2/1999 | |
| GB | 2369175 | | 5/2002 | |
| GB | 2432645 | | 5/2007 | |
| WO | 9500748 | | 1/1995 | |

\* cited by examiner

CAMSHAFT UNIT

FIELD OF THE INVENTION

The invention relates to a camshaft unit with two camshafts that are arranged concentric to each other and with a camshaft adjuster.

BACKGROUND

Camshaft units with camshafts that are arranged concentric to each other, also called dual camshafts, have a first camshaft that extends, as the inner camshaft, at least partially into a second camshaft as the outer camshaft. Camshaft units according to this class for actuating gas-exchange valves of an internal combustion engine are known, for example, from EP 0 582 846 B1 or U.S. Pat. No. 6,725,817. The camshaft units each have, for each camshaft, a camshaft adjuster that allows a phase shift with respect to the crankshaft. The camshaft adjuster of these camshaft units are each hydraulically actuated. Such hydraulic drives have relatively sluggish reactions in operation and temperature-dependent control values due to the oil temperature-dependent viscosity. In addition, larger adjustment angles are difficult and cannot be achieved for the previously mentioned special types of drives.

EP 1 803 904 A2 shows another camshaft unit according to the class with two camshaft adjusters. The camshaft unit has a protruding construction and requires complicated tuning of the two camshaft adjusters. The camshaft adjusters can also be arranged in the cylinder head on opposite ends of the camshafts. This increases the installation space requirements and there is no free camshaft end that could be used, for example, for attaching a fuel pump. Due to the plurality of parts to be mounted, this arrangement is also complicated in production.

SUMMARY

The objective of the invention is to create a camshaft unit that requires little installation space and has a simple construction.

This objective is met by a camshaft unit having a first camshaft, a second camshaft that is arranged concentric to the first camshaft, and a camshaft adjuster with which both camshafts are phase-adjustable with respect to the crankshaft.

The camshaft unit according to the invention allows an adjustment of both camshafts by only one camshaft adjuster. A second camshaft adjuster with another drive can therefore be eliminated. Therefore the camshaft unit can be produced not only more economically, but a nesting of the camshaft adjusters is also eliminated and the free end of the camshaft turned away from the camshaft adjuster can be used for attaching other secondary units, for example, a fuel pump.

So that the two camshafts can be adjusted by the same camshaft adjuster both relative to each other and also relative to the crankshaft, a forced coupling is provided. The two camshafts thus cannot be adjusted independently of each other, but instead their angular offset is always specified by the position of the forced coupling element. Thus, at a known phase position of a camshaft, the phase position of the other, force-coupled camshaft can be determined.

Therefore, to determine the rotational angle position of the camshafts, only one sensor unit is required. Here it is not significant whether the sensor unit is arranged directly on one of the camshafts, the forced coupling element, or another part of the camshaft adjuster that is fixed in phase with respect to the forced coupling element. In this way, one sensor unit is sufficient to determine the position of both camshafts.

The forced coupling element connects the two camshafts advantageously in a mechanical way. It can be loaded directly or indirectly by the camshaft adjuster and can be constructed as a connecting element. When the camshaft adjuster is adjusted, the forced coupling element performs a movement that causes a forced rotation of the camshafts relative to each other. Alternatively or additionally, the connecting element can also be loaded, locked, or superimposed by an additional actuator separated by the camshaft adjuster.

The forced coupling of the forced coupling element formed as a connecting element with the camshafts is realized in an embodiment by means of toothed sections. The toothed sections can be formed, for example, as straight, helical, spherical, or sliding toothed sections and can be arranged on the ends on the camshafts. The connecting element has multiple toothed sections that simultaneously mesh with counter toothed sections on the camshafts. If the connecting element becomes blocked on its axial position, the toothed engagement consequently also defines the rotational angle positions of both camshafts with respect to the connecting element and thus with respect to the camshaft adjuster. In contrast, if the connecting element is shifted in the axial direction, the meshing helical toothed sections cause, for the axially fixed camshaft, a relative rotation of the camshaft with respect to the connecting element.

In one embodiment, the helical toothed sections are oriented in the same direction. Shifting the connecting element thus leads to an adjustment of the camshafts with the same rotational sense. The helix angle of the two toothed sections are preferably different, in order to also perform a relative rotation of the camshafts relative to each other.

In another embodiment, the helix angles have a different sign and are thus formed as counter helical toothed sections. Due to the toothed sections oriented in opposite directions, an axial shifting of the connecting element leads to an adjustment of the first camshaft in the "advanced" direction and the second camshaft in the "retarded" direction and thus to a clearly larger spread of the relative rotational angular positions of the camshafts.

The connecting element is arranged coaxial to the camshafts and can be shifted in the axial direction by an adjustment drive in the direction of the camshaft main axes. To cause a sufficiently large camshaft adjustment by means of a manageable drive power, the adjustment drive preferably has a speed-changing gear between the actuator of the camshaft adjuster and the connecting element. If a rotational movement is initially introduced by the actuator, a conversion into an axial movement of the connecting element is also required.

The large speed change can be achieved by means of a spindle drive that results in a linear displacement of the connecting element and thus a forced rotation of the engaged camshafts due to the helical toothed sections. The spindle drive preferably has a spindle and a threaded nut as a ball screw-type drive. The helical guide track of the spindle causes an axial advance that leads to a relative rotation of the camshafts with respect to the drive wheel due to the helical toothed sections of the camshafts and the connecting element. By means of the adjustment motor, the drive of the camshafts can therefore be reinforced or delayed. The spindle can be connected to the drive shaft of an electric motor or formed by this itself. The threaded nut can be connected rigidly to the connecting element or the connecting element itself can have a lateral surface oriented with a corresponding surface contour with respect to the spindle and is thus formed integrally with the threaded nut. Alternatively, a threaded nut is held on the connecting element in the axial direction by a retaining means.

Preferably the connecting element is formed as a sleeve, wherein the camshafts are attached to the sleeve on surfaces offset with respect to each other in the axial direction. The sleeve can be displaced in the axial direction by the previously described spindle drive or by another drive. The instantaneous transmission from the connecting element to the camshafts can be realized both at the outer lateral surface and also at the inner lateral surface of the connecting element.

In a first construction of the sleeve-shaped connecting element, the connection of two camshafts is realized by means of the inner lateral surface of the sleeve. This construction is advantageous, for example, if both camshafts are constructed as hollow shafts and the inner camshaft can be supported on a central shaft. So that the displacement element can mesh with both camshafts, it has a radial shoulder whose width corresponds to the diameter of the inner camshaft. This produces a stepped sleeve that can mesh at its different diameters with the different camshafts. On the inner side, the stepped sleeve in the area of its larger diameter can have a threaded nut for connecting to a spindle. The camshaft unit thus has a compact construction.

In a second construction, the connection of both camshafts is realized by means of the outer lateral surface. In this construction, the connecting element can be realized with thin walls and can have a constant wall thickness. The connecting element thus has low mass. Furthermore, the toothed sections in the outer lateral surface can be formed more easily than in the inner lateral surface, so that the production of the displacement element is simplified.

In a third construction, the displacement element has a ring groove on the end side. The ring groove walls have toothed sections that can mesh with counter toothed sections on the camshafts. For this purpose, both camshafts extend into the ring groove and the counter toothed section of the outer camshaft meshes with the outer ring groove toothed section, while the counter toothed section of the inner camshaft meshes with the inner ring groove toothed section. In this variant, no axial offset of the toothed sections is required for the two camshafts on the displacement element, so that the entire camshaft unit can have an axially shorter construction.

In a fourth construction, the displacement element formed as a cylindrical sleeve has a toothed section on both its inside and also outside lateral surfaces. The two toothed sections each mesh with a counter toothed section on different camshafts that enclose, for this purpose, the sleeve end both on the radially inner and also radially outer sides. To hold the sleeve, both camshafts are reduced somewhat in radius on the ends. A displacement element in this variant can have an especially thin-walled construction and can optionally be produced as a sheet metal part.

In the four constructions, each inner camshaft can be supported on a central shaft. Preferably the support is realized by means of a rolling bearing. In particular, if the mechanical coupling of the displacement element is realized on the camshafts by means of helical toothed sections, the bearing can be constructed as an axial bearing. The central shaft can have thread turns in its axial extent and can thus form a spindle of an adjustment drive that can be operated with an electric motor.

The camshafts are part of a valve train as valve camshafts. They have several intake or exhaust cams that are in active connection with allocated gas exchange valves. The camshafts rotate in a cylinder head of an internal combustion engine. Preferably by means of a drive plate, such as a chain wheel, the camshafts or the camshaft adjuster is in connection with the crankshaft. When the internal combustion engine is running, the camshafts are then driven by the crankshaft by means of the drive plate and actuate the gas exchange valves. The drive plate is preferably also connected to the camshaft adjuster that can be driven, for example, electrically by means of an adjustment motor.

The camshaft adjuster preferably acts on two camshafts. In one construction it can be provided that the connecting element meshes with only one of the camshafts and adjusts this directly. The other camshaft is then disconnected from the connecting element and can be fixed in phase with respect to the first camshaft or coupled with this by means of a separate adjustment mechanism, so that an indirect adjustment of the second camshaft is realized.

The camshafts can also be connected, instead, indirectly to the connecting element. Then this is not connected directly to the camshaft, but instead this acts, for example, via an intermediate shaft, on at least one of the camshafts.

BRIEF DESCRIPTION OF THE DRAWINGS

The invention will be explained in more detail below with reference to embodiments shown in the drawing. Shown are.

DETAILED DESCRIPTION OF THE PREFERRED EMBODIMENTS

Figure 1:
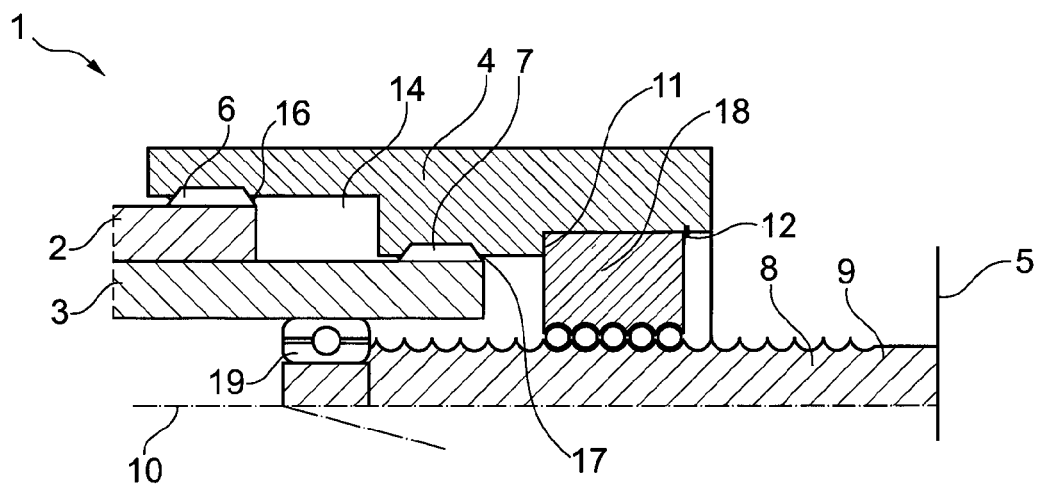
FIG. 1 a first camshaft unit in longitudinal section with a displacement element that has two inner toothed sections, FIG. 2 a second camshaft unit in longitudinal section with a displacement element that has two outer toothed sections, FIG. 3 a third camshaft unit in longitudinal section with a displacement element that has an end-side ring groove, FIG. 4 a fourth camshaft unit in longitudinal section with a displacement element that has an inner and an outer toothed section.

FIG. 1 shows a first camshaft unit 1 with a first camshaft 2, a second camshaft 3 arranged concentric to the first camshaft 2, and a connecting element 4. The connecting element 4 connects to the first camshaft 2 via a first toothed section 16 and to the second camshaft via a second toothed section 17. For this purpose, the connecting element 4 is formed as a stepped sleeve that has two different inner radii and surrounds two camshafts 2, 3 on the outside in the radial direction. The inner radius difference corresponds to the ring diameter of the outer camshaft that is presently formed by the first camshaft 2. The two camshafts 2, 3 extend by different amounts in the axial direction into the inner hollow space 14 of the connecting element 4. The toothed sections 16, 17 of the connecting element 4 mesh with counter toothed sections 6, 7 of the camshafts 2, 3. All three components, the two camshafts 2, 3 and the connecting element 4, can rotate about the common rotational axis 10.

The connecting element 4 can move in the axial direction. The axial advance is introduced by a camshaft adjuster 5 that is shown only schematically and has an adjustment drive 9 that can be operated by means of an electric motor. The adjustment drive 9 is formed by a shaft in the form of a spindle 8 on which a threaded nut 18 is arranged. With the threaded nut 18, the spindle 8 forms a ball screw-type drive. In the present case, the threaded nut 18 is produced separately from the connecting element 4 and is connected rigidly to the connecting element 4. On one side it contacts a radial shoulder 11 of the connecting element 4 and is held by a securing ring 12 on its other axial end.

The shaft has, on its shaft end, a ball bearing 19 by means of which the inner camshaft is supported.

The toothed sections 16, 17 and their contour toothed sections 6, 7 are constructed as helical toothed sections. Rotation of the spindle 8 initially causes an axial advance of the connecting element 4 connected to the threaded nut 18. The torque introduced by the toothed sections 16, 17 on the camshafts 2, 3 causes their rotation due to their fixed positioning in the axial direction.

Figure 2:
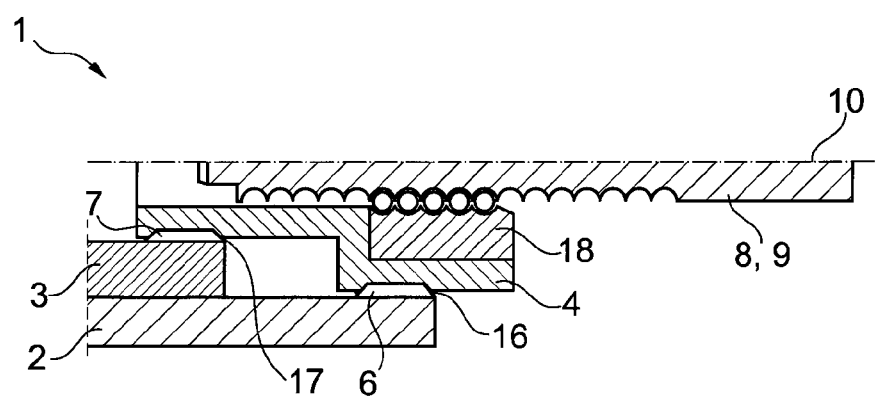

FIG. 2 shows a construction of a camshaft unit 1 that differs from that according to FIG. 1 essentially in that the connecting element 4 is formed as a sleeve whose wall thickness is approximately constant. Furthermore, the camshafts 2, 3 do not have meshing teeth with this on the inner periphery of the sleeve, but instead on the outer casing 13. The sleeve-shaped connecting element 4 can therefore have an essentially constant wall thickness and can be lighter in weight. This connecting element 4 also has a radial shoulder 11 on which the threaded nut 18 contacts. With the radial shoulder 11, the diameter of the sleeve is simultaneously expanded to the inner periphery of the outer camshaft 3. This sleeve therefore has only two steps, while the sleeve according to FIG. 1 has three different inner diameter regions (for the two camshafts 2, 3 and the threaded nut 18).

Figure 3:
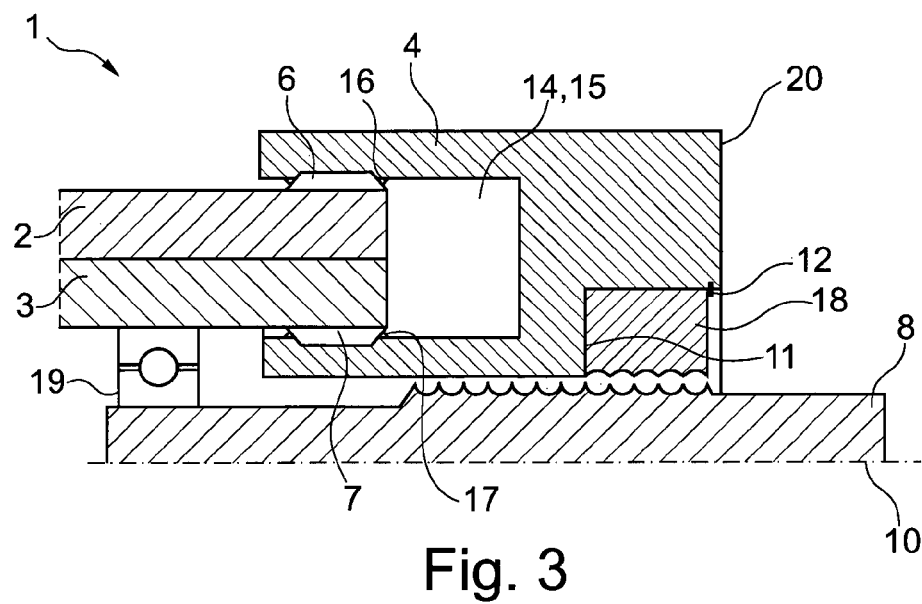

FIG. 3 shows a construction of a camshaft unit 1 that differs from that according to FIG. 1 essentially in that the connecting element 4 is constructed as a sleeve with a ring groove 15 formed axially on the end side. The ring groove 15 runs concentric to the rotational axis 10 and has a groove base that is bounded by an outer wall with the first toothed section 16 and an inner wall with the second toothed section 17. The two toothed sections 6, 7 are in turn constructed as helical toothed sections. Because the two camshafts 2, 3 mesh on different walls, an axial offset of the camshaft is not required. The ring groove 15 can thus be relatively flat, so that the inner hollow space 14 still present here could also be completely omitted.

On the end 20 of the connecting element 4 facing away from the ring groove 15 there is, on the radial inner side, a recess for the threaded nut 18.

Figure 4:
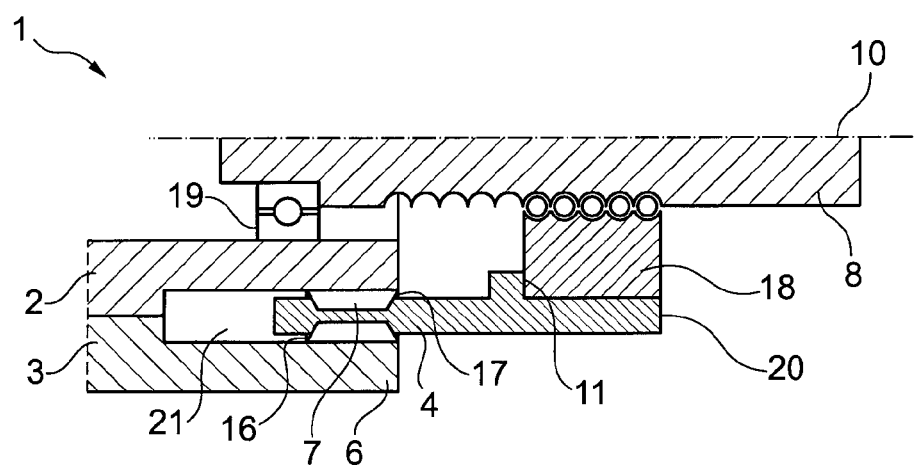

FIG. 4 shows a construction of a camshaft unit 1 that differs from that according to FIG. 1 in that the connecting element 4 is formed as a sleeve with an essentially constant diameter. Such a sleeve can be produced economically. As in the embodiment according to FIG. 3, the counter toothed sections 6, 7 of the camshafts 2, 3 engage in the toothed sections 16, 17 of the connecting element 4 from different radial directions. For this purpose, the camshafts 2, 3 adjacent to each other actually in the radial direction each form a ring-shaped recess and together form a ring gap 21. The counter toothed sections 6, 7 are arranged on the walls of the ring-shaped recess. The connecting element 4 extends with its toothed sections 16, 17 into the ring gap 21. The connecting element 4 is connected via the threaded nut 18 to the spindle 8 on its end 20 turned away from the ring gap 21.

The invention claimed is:

1. A camshaft unit, comprising:
 a first camshaft,
 a second camshaft that is arranged concentric to the first camshaft,
 a camshaft adjuster with which the first and second camshafts are phase-adjustable, the camshaft adjuster has a connecting element that moves in an axial direction of the camshafts and comprises a first toothed section and a second toothed section, the first toothed section meshes with a first counter toothed section on the first camshaft and the second toothed section meshes with a second counter toothed section on the second camshaft, and the first toothed section and the second toothed section of the connecting element are constructed as helical toothed sections, wherein the camshaft unit has an adjustment drive with a ball screw drive including a spindle that drives a threaded nut directly mounted on the connecting element, the connecting element is formed as a sleeve, and the threaded nut is arranged in a sleeve interior of the sleeve and secured in the axial direction.

2. The camshaft unit according to claim 1, wherein the first and second camshafts are coupled to the camshaft adjuster and the camshaft adjuster drives an opposite-phase adjustment of the first and second camshafts.

3. The camshaft unit according to claim 1, wherein the sleeve has a radial shoulder and the first and second toothed sections are formed on tubular wall sections with different diameters.

4. The camshaft unit according to claim 3, wherein the sleeve has an end-side ring groove having an outer wall that has the first toothed section and having an inner wall that has the second toothed section.

5. The camshaft unit according to claim 1, wherein the sleeve has an outer casing on which the first toothed section is formed and having an inner casing on which the second toothed section is formed.

6. The camshaft unit according to claim 1, wherein both of the first counter toothed section and the second counter toothed section are constructed as helical toothed sections.

7. A camshaft unit, comprising:
 a first camshaft,
 a second camshaft that is arranged concentric to the first camshaft,
 a camshaft adjuster with which the first and second camshafts are phase-adjustable, the camshaft adjuster has a connecting element that moves in an axial direction of the camshafts and comprises a first toothed section and a second toothed section, the first toothed section meshes with a first counter toothed section on the first camshaft and the second toothed section meshes with a second counter toothed section on the second camshaft, and the first toothed section and the second toothed section of the connecting element are constructed as helical toothed sections, wherein the camshaft unit has an adjustment drive with a ball screw drive including a spindle that drives a threaded nut directly mounted on the connecting element, and one of the first and second camshafts is supported by ball bearings on the spindle.

8. The camshaft unit according to claim 7, wherein the first and second camshafts are coupled to the camshaft adjuster and the camshaft adjuster drives an opposite-phase adjustment of the first and second camshafts.

9. The camshaft unit according to claim 7, wherein the sleeve has a radial shoulder and the first and second toothed sections are formed on tubular wall sections with different diameters.

10. The camshaft unit according to claim 9, wherein the sleeve has an end-side ring groove having an outer wall that has the first toothed section and having an inner wall that has the second toothed section.

11. The camshaft unit according to claim 7, wherein the sleeve has an outer casing on which the first toothed section is formed and has an inner casing on which the second toothed section is formed.

12. The camshaft unit according to claim 7, wherein both of the first counter toothed section and the second counter toothed section are constructed as helical toothed sections.

* * * * *